United States Patent [19]

Crain et al.

[11] Patent Number: 4,953,097

[45] Date of Patent: * Aug. 28, 1990

[54] PROCESS CONTROL SYSTEM USING REMOTE COMPUTER AND LOCAL SITE CONTROL COMPUTERS FOR MIXING A PROPPANT WITH A FLUID

[75] Inventors: Stephen F. Crain; Mark A. Clark; Edward L. Woodall, all of Duncan, Okla.

[73] Assignee: Halliburton Company, Duncan, Okla.

[ * ] Notice: The portion of the term of this patent subsequent to Apr. 10, 2007 has been disclaimed.

[21] Appl. No.: 384,740

[22] Filed: Jul. 25, 1989

Related U.S. Application Data

[62] Division of Ser. No. 947,099, Dec. 24, 1986, Pat. No. 4,916,631.

[51] Int. Cl.[5] .................. G06F 15/46; G06G 7/58; G05D 11/02; G05D 11/08
[52] U.S. Cl. .................... 364/502; 364/131; 364/162
[58] Field of Search ............... 364/131, 132, 138, 162, 364/510, 502

[56] References Cited

U.S. PATENT DOCUMENTS

| 4,152,760 | 5/1979 | Freitas et al. | 364/138 |
| 4,176,064 | 11/1979 | Black | 210/196 |
| 4,424,559 | 1/1984 | Lorincz et al. | 364/131 |
| 4,517,637 | 5/1985 | Cassell | 364/138 |
| 4,626,984 | 12/1986 | Unruh et al. | 364/132 |
| 4,636,934 | 1/1987 | Schwendemann et al. | 364/132 |
| 4,675,803 | 6/1987 | Kendall et al. | 364/131 |
| 4,701,095 | 10/1987 | Berryman et al. | 414/332 |
| 4,715,721 | 12/1987 | Walker et al. | 366/132 |
| 4,751,648 | 6/1988 | Sears, III et al. | 364/422 |
| 4,850,750 | 7/1989 | Cogbill et al. | 406/82 |

FOREIGN PATENT DOCUMENTS 0148264 5/1981 German Democratic Rep. ........................... 364/131

OTHER PUBLICATIONS

Marathe, A. D. et al., "Hardware Link Directs Multicomputer Interactions in Process Control", *Computer Design*, vol. 18, No. 2, Feb. 1979, 93-101.

Primary Examiner—Clark A. Jablon
Attorney, Agent, or Firm—James R. Duzan; E. Harrison Gilbert, III

[57] ABSTRACT

A process control system includes a remote control computer located remotely from where the process is to be performed, and the system includes a monitor computer and a local control computer both located where the process is to be performed. The monitor computer and the local control computer are connected to the remote control computer by a common cable including at most two communication channels, each defined in a preferred embodiment by a respective pair of electrical conductors.

3 Claims, 15 Drawing Sheets

4,953,097

PROCESS CONTROL SYSTEM USING REMOTE COMPUTER AND LOCAL SITE CONTROL COMPUTERS FOR MIXING A PROPPANT WITH A FLUID

This is a divisional of copending application(s) Ser. No. 06/947,099 filed on Dec. 24, 1986, now U.S. Pat. No. 4,916,631.

BACKGROUND OF THE INVENTION

This invention relates generally to process control systems and more particularly, but not by way of limitation, to a system for controlling at a well site an apparatus for moving a proppant into a mixing container into which a fluid is flowed for obtaining a blend having a desired concentration of the proppant in the fluid, which blend is to be pumped into the well and which apparatus and mixing container are mounted on a trailer.

Sometimes a process needs to be controlled by a system which can be operated either locally (i.e., near where the process is being performed) or remotely (i.e., spaced from where the process is being performed). Remote control implies the need for some communication means between a local device located near where the process is being performed and a remote device spaced from such location. To facilitate installation and to preclude overly obstructing the area between the local and remote devices, such communication means should be relatively simple and compact; however, such communication means must be capable of handling sufficient quantities and rates of data transmission in both directions between the local and remote devices.

A process control system also often needs to be able to monitor a base or primary characteristic of the process because another characteristic is to be controlled relative to such base or primary characteristic. Feedback from this other, controlled characteristic also needs to be received to determine if the desired control is being obtained.

To provide such a process control system, there is the need for a versatile hardware configuration which can be used to control different processes with little, if any, changes in the hardware being necessary from one process to another. To accomplish this end, the hardware system needs to be designed so that individual parts or sections of the system can be individually programmed to accommodate a specific application. This system should use a simplified communication means by which information can be transferred between the remote and local portions without elaborate interconnections being needed and without overly obstructing the area between the local and remote portions.

By way of example with a specific application, such a control system should be adaptable to control a conventional blender used at a well site to mix a proppant with a fluid to form a fracturing slurry. One known type of conventional blender is a blender trailer manufactured by Halliburton Services. To control such a blender, there need to be parts of the control system adapted to be mounted on the blender trailer and a separate portion adapted to be located remotely from the trailer, such as in a vehicle referred to as a frac van. The parts mountable on the blender trailer should be designed to respond to control signals from the remote part, but the b-lender-mountable parts should also be capable of implementing local control and even automatic control based on the last received command should there be a loss of communication with the remote control portion. In this specific application, such process control should provide for obtaining and maintaining proper concentrations of proppant relative to the fluid so that the desired slurry is obtained. In a specific implementation, this process control system should allow for variable concentrations to be obtained (e.g., ramp or step changes in concentration). This allows optimally designed fracturing schedules to be implemented more easily than may be accomplished solely through known manual control techniques.

SUMMARY OF THE INVENTION

The present invention meets the aforementioned needs by providing a novel and improved process control system. The system has a hardware configuration which is contemplated to be adaptable to different environments and different processes with little, if any, hardware changes. Any substantial modifications needed are implemented by software changes within respective portions of the overall system. The present invention provides remote control through at most two communication channels interconnecting the remote and local portions of the invention. Despite such simple and compact communication means, the interconnecting channels are capable of handling sufficient quantities and transmission rates of information to accomplish real time control of the process. The present invention is particularly adaptable to control a conventional blender by which a fracturing slurry is obtained. Variable concentrations of a proppant mixed with a fluid to define the fracturing slurry can be readily obtained with the present invention.

The process control system of the present invention comprises a remote control computer, including means for receiving control information; a local control computer including means for receiving feedback information from a controlled characteristic of the process, and also including means for providing, in response to the control information from the remote control computer and to the feedback information, a control signal to control the controlled characteristic of the process; and cable means for connecting the remote control computer to the local control computer, which cable particularly includes two pairs of electrical conductors in a preferred embodiment. The control system further comprises a monitor computer connected to the local control computer and to the cable means. This monitor computer includes means for providing real time information about an operating characteristic of the process, which real time information is communicated to the local control computer so that the control signal is provided also in response to the real time information.

Therefore, from the foregoing, it is a general object of the present invention to provide a novel and improved process control system. Other and further objects, features and advantages of the present invention will be readily apparent to those skilled in the art when the following description of the preferred embodiment is read in conjunction with the accompanying drawings.

DETAILED DESCRIPTION OF THE PREFERRED EMBODIMENT

Figure 1:
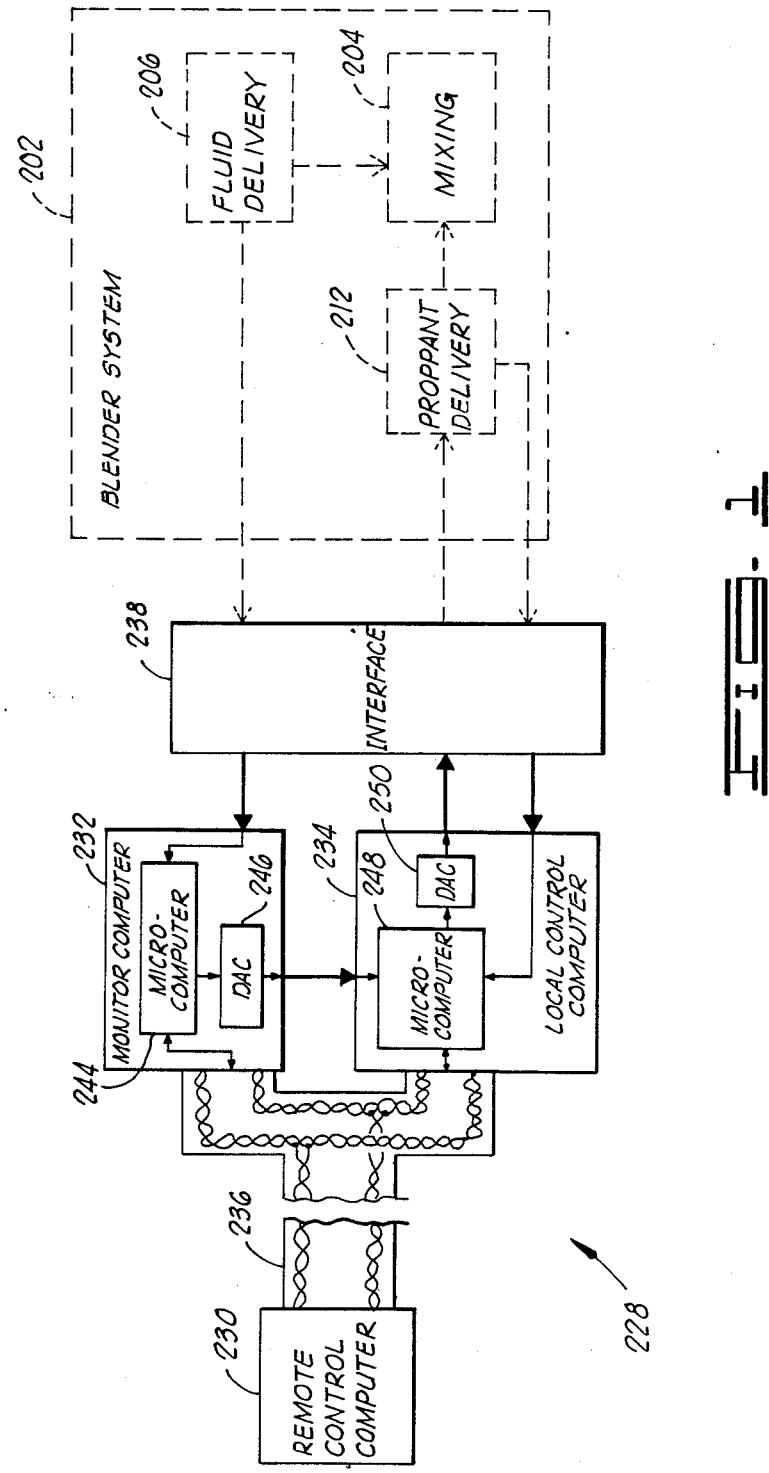
FIG. 1 is a block diagram of the preferred embodiment of the process control system of the present invention, shown associated with a blender system.

The present invention will be described with reference to a particular application with a blender system used at an oil or gas well site to produce a fracturing fluid to be pumped into the well. The blender system is identified in FIG. 1 by the reference numeral 202, and it broadly includes a mixing container subsystem 204 into which a base or primary fluid (e.g., a gel) is pumped or otherwise flowed from a fluid delivery subsystem 206. One or more flow meters (two are shown in FIG. 2 and identified by the reference numerals 208, 210) included in the subsystem 206 provide electrical signals representing the flow rate of the clean (i.e., unblended) fluid as it flows into the mixing container subsystem 204. Added to the fluid in the mixing container subsystem 204 is a proppant, such as a sand of a type as known to the art, moved from a proppant delivery subsystem 212. The movement of the proppant can be obtained by any suitable mechanism, such as a screw conveyor. In a particular embodiment with which the present invention is contemplated to be used, the proppant delivery subsystem 212 includes three sand screw conveyors 214, 216, 218 (FIG. 2). Associated with these sand screw conveyors 214, 216, 218 are transducers 220, 222, 224, respectively, which provide electrical signals representative of the speeds of the respective screw conveyors.

Figure 2:
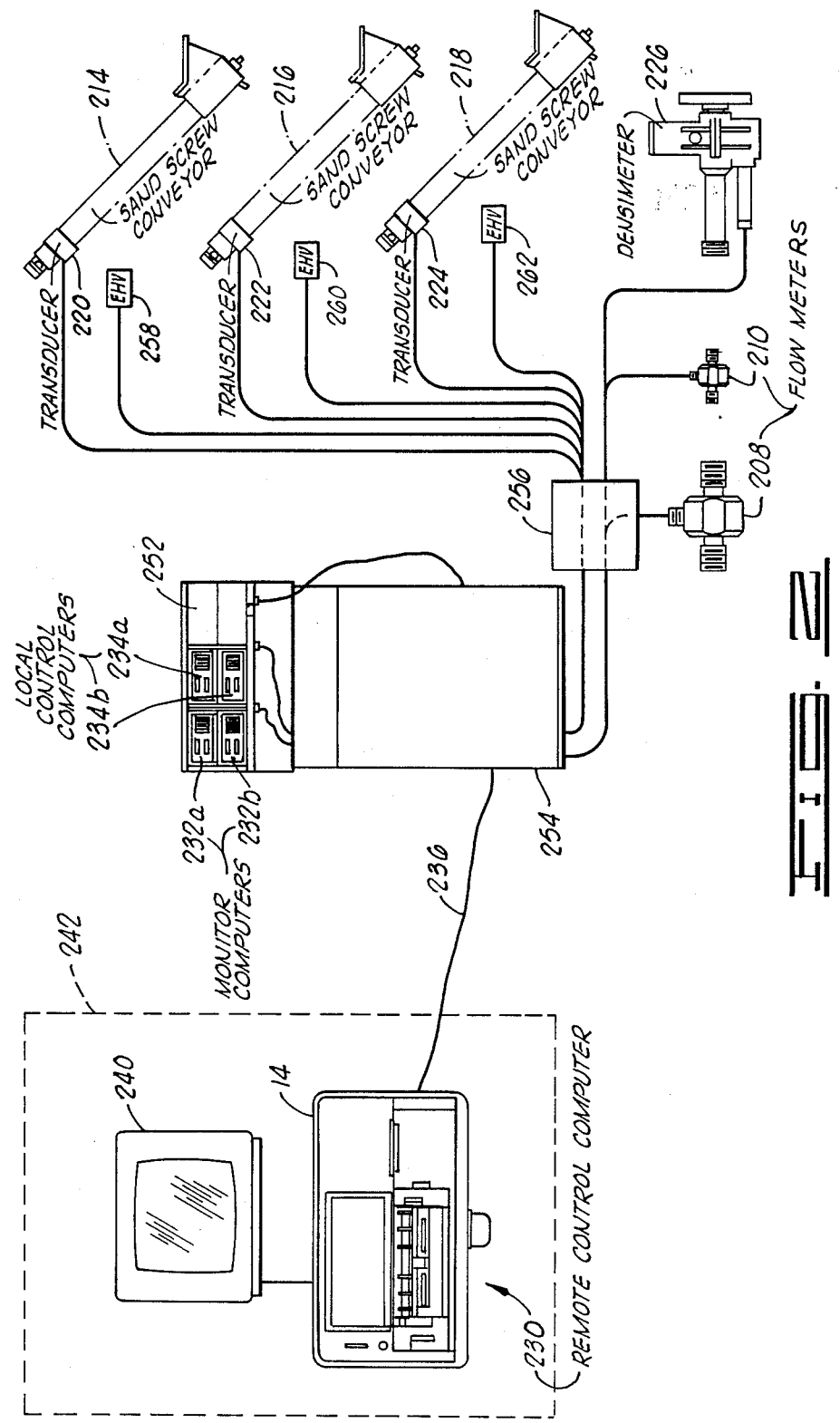
FIG. 2 is a schematic illustration of a particular implementation of the process control system illustrated in FIG. 1, shown associated with specific elements of the blender system.

Another component of the blender system 202, which is shown in FIG. 2 but not FIG. 1, is a densimeter 226 of a suitable type as known to the art for monitoring the density of the slurry pumped out of the mixing container subsystem 204 by any suitable means known to the art.

These features of the blender system 202 can be implemented by suitable devices known to the art, such as those currently found on a conventional blender trailer manufactured by Halliburton Services.

The control system of the present invention is generally identified in FIG. 1 by the reference numeral 228. The preferred embodiment of the system 228 is designed so that it can be retrofitted to the blender system 202 to control the speed of the sand screw conveyors 214, 216, 218 and, therefore, to control the delivery of the proppant into the mixing container subsystem 204, which controls the concentration of the proppant in the resultant slurry and thus the density of the slurry. It is contemplated that the hardware configuration of the present invention as depicted in FIG. 1 can be adapted to control different processes with little or no hardware modification being needed; the only modifications needed are contemplated to be software changes applicable to the particular requirements of the particular process to be controlled. Therefore, the present invention is directed primarily to the hardware configuration of the process control system without regard to specific software programming needed for any particular application.

The process control system 228 includes a remote control computer 230, a monitor computer 232, a local control computer 234, and cable means 236 for connecting the remote control computer 230 to the monitor computer 232 and the local control computer 234. The system 228 also includes interface means 238 for interfacing the monitor computer 232 and the local control computer 234 to the equipment for implementing the process to be controlled.

The remote control computer 230 is constructed the same as the recording unit 14 disclosed in U.S. Pat. Application Ser. No. 847,397 now U.S. Pat. No. 4,751,648, incorporated herein by reference. The remote control computer 230 of the present invention additionally has a CRT display screen 240 connected to the equivalent of the recording unit 14 as illustrated in FIG. 2. The software used in the recording unit 14 for the present invention is different from that disclosed in the prior application; this new software is shown in the flow charts of FIGS. 4A-4H herein. The significance of this new software is with regards only to the specific application to which the process control system 228 is described herein. That is, the hardware configuration of the components is of primary concern to the broadest scope of the present invention because the software will likely change for different types of processes.

The recording unit 14, with its built-in printer, two disk drives and keyboard, and the CRT 240 are mounted in the illustrated embodiment in a vehicle 242, such as a frac van of a type as known to the art. Being so implemented, the remote control computer 230 can be easily spaced from the location where the blender system 202, implemented in the specific application on a portable trailer, is located.

During use, the CRT 240 is used to display information during the job and to enter data for set-up and calibration. A pre-job program stored within the remote control computer 230 allows the operator at the keyboard of the recording unit 14 to design or enter a desired sand delivery program, such as a ramp-shaped schedule of sand concentrations. Thus, the remote control computer 230 has means for receiving control information (sand concentration values in this case) which are to be transferred to the local control computer 234 for implementing the process control. Such a ramp would be based on the total volume of sand, the starting sand concentration and the ending sand concentration. Several programs can be designed at one time and saved on the disks. The program selected for real time operation sends out control parameters (i.e., incremental sand concentrations) to the local control computer 234, but the program also displays, through the CRT 240, the data from the monitor computer 232 and the local control computer 234 in real time. The calibration for the sand screws or flow meters can be changed from the remote control computer 230. Examples of parameters displayed in real time include clean flow rate (i.e., the rate of the fluid flowing from the fluid delivery subsystem 206 into the mixing subsystem 204), total sand concentration, percent error of the sand delivery, and the amount of sand remaining.

The monitor computer 232 and the local control computer 234 are modified versions of the data acquisition modules 43 described in U.S. Application Ser. No. 847,397, now U.S. Pat. No. 4,751,648, incorporated herein by reference. The differences between the computers 232, 234 and the modules 43 are that the devices of the present invention include an additional circuit board having amplifiers for increasing the resolutions of signals received from transducers. These circuits also include digital-to-analog converters used to output analog signals. Broadly, the monitor computer 232 includes a microcomputer 244 and a digital-to-analog converter 246. The microcomputer 244 receives an input signal through the interface means 238 from one of the flow meters 208, 210 of the fluid delivery subsystem 206. The microcomputer 244 also receives information from and transmits information to the remote control computer 230 over the 15 cable 236. The microcomputer 244 provides a digital output to the converter 246 which in turn provides a corresponding analog output to the local control computer 234.

The local control computer 234 includes a microcomputer 248 and a digital-to-analog converter 250. The microcomputer 248 receives the signal from the converter 246, and the microcomputer 248 also receives a signal from a respective one or ones of the transducers 220, 222, 224 of the proppant delivery subsystem 212. The microcomputer 248 communicates with the remote control computer 230 through the cable 236 so that the microcomputer 248 receives the sand concentration values from the computer 230 in the illustrated application. The microcomputer 248 provides a digital output signal to the converter 250, which in turn provides an analog control signal to the interface means 238 for use by the interface means 238 in controlling the proppant delivery subsystem 212.

Figure 3:
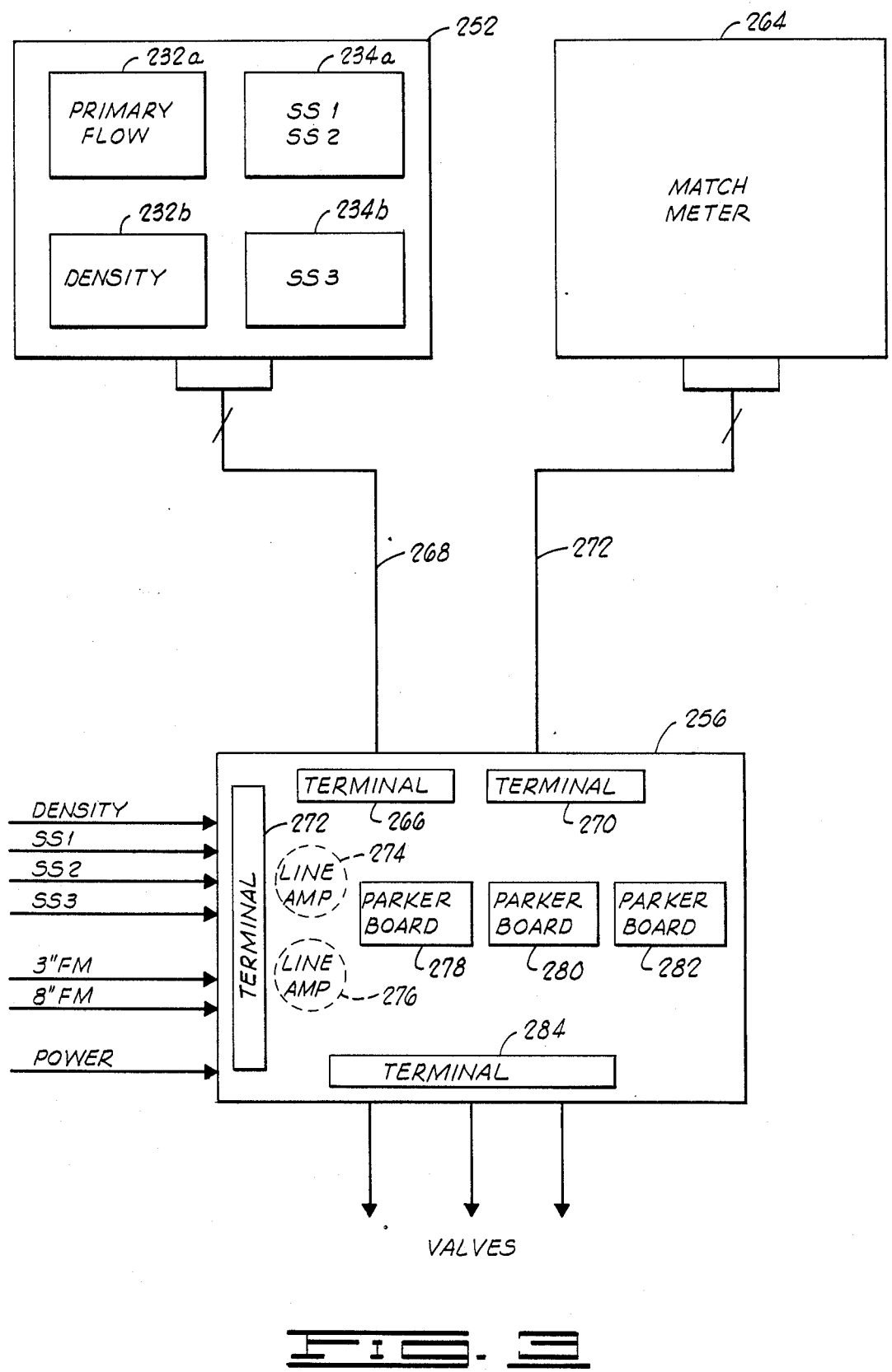
FIG. 3 is a block diagram of the local portion of the process control system shown in FIG. 2.

In the specific implementation of the embodiment of the present invention shown in FIGS. 2 and 3, there are two monitor computers 232a, 232b, and two local control computers 234a, 234b. The monitor computer 232a monitors the selected one of the two flow meters 208, 210, and the monitor computer 232b monitors the output from the densimeter 226. The local control computer 234a is used to control the sand screws 214, 216, and the local control computer 234b is used to control the sand screw 218.

These four computers are contained in their respective housings in correspondence to the constructions of the data acquisition modules 43 described in U.S. Pat. Application Ser. No. 847,397, now U.S. Pat. No. 4,751,648, incorporated herein by reference. These four units are mounted in the illustrated embodiment of the present invention in an enclosure forming a lid 252 of a control stand 254 mounted on the trailer of the exemplary blender system 202. During transportation of the blending system 202, the lid 252 hinges downward to provide a cover to the control stand 254. In the operating position, the lid 252 hinges upward to reveal the digital displays and to provide access to keypads forming parts of the computers 232, 234.

In each of the monitor computers 232a, 232b, the respective microcomputer digitally processes real time information received in the form of an electrical signal from the respective transducer (i.e., in the illustrated embodiment either the flow meters 208, 210 or the densimeter 226). The digital-to-analog converter of the respective computer 232a, 232b converts the digitally processed real time information into analog electrical signals for transmission. With respect to the monitor computer 232a, this transmission is to the local control computers 234a, 234b [in the preferred embodiment this transmission is through an operational amplifier whose inputs are connected to the digital-to-analog converter outputs and whose output is connected to two voltage-to-current (V/I) converters, each of which V/I converters is connected to a respective one of the computers 234a, 234b) With respect to the density monitoring provided by the monitor computer 232b, the analog electrical signal is communicated to the remote control computer 230. Therefore, the monitor computers 232 can generally be referred to as including means for providing real time information about one or more operating characteristics of the process.

Each of the local control computers 234a, 234b includes means for receiving feedback information from a controlled characteristic of the process. In the illustrated embodiment, this means is provided by the respective microcomputer 48 receiving an input from a respective one or ones of the transducers 220, 222, 224. Each local control computer also includes means for providing a control signal to control the controlled characteristic of the process. This is accomplished by the respective microcomputer and its associated digital-to-analog converter. In the preferred embodiment, the control signals are provided in response to the feedback information, the control information from the remote control computer 230, and the real time information from the monitor computer or computers 232.

The cable 236 of the preferred embodiment is a local area network cable identical to the cable 16 described in U.S. Pat. Application Ser. No. 847,397, now U.S. Pat. No. 4,751,648. Such cable is connected between the remote control.-computer 230 and all of the monitor computers 232 and local control computers 234. This allows the monitored real time information (e.g., the clean flow rates and the density or sand concentration) to be communicated to the remote control computer 230. This also allows the control information (e.g., the desired concentration value) to be communicated to the local control computers 234.

Being the same as the cable 16 in the preferred embodiment, the cable 236 includes two pairs of twisted wires connecting the remote control computer 230 to the blender-mounted computers 232, 234. These twisted wires define the preferred embodiments; however, more generally, the cable requires only a single communication channel to communicate the informational data. As in the prior application, however, a second commmunication channel is provided through which timing information can be transmitted. At most, only these two communication channels are needed in the preferred embodiment of the present invention, which channels can be implemented by any suitable communication mechanism or medium whether twisted wires, other electrical conductors or otherwise (e.g., optical fibers).

The interface means 238 of the preferred embodiment of the present invention includes a junction box 256 and electrohydraulic valves 258, 260, 262. The junction box 256 provides a place to gather all the wiring for the electrical signals and to house the electronics for driving the electrohydraulic valves. The wiring is designed to allow an existing match meter system 264 (FIG. 3) of a type as known to the art to be left intact on the blender system 202. As shown in FIG. 3, the junction box 256 includes a terminal 266, which is connected by a cable 268 to the computers 232a, 232b, 234a, 234b. The junction box 256 also includes a terminal 270, which is connected by a cable 272 to the match meter 264. The terminals 266, 270 are interconnected in parallel to a terminal 272 to which signals from the blender system 202 are received. As indicated in FIG. 3, these signals include the flow meter, sand screw speed transducer, and densimeter signals generated by the transducers 208, 210, 220, 222, 224, 226. A power signal is also received at the terminal 272. These signals are commonly connected to both the terminal 266 and the terminal 270. Line amplifiers 274, 276 can be used with these signals to provide amplification as needed (e.g., to boost the flow meter signals so that they can drive both the computer 232a and the match meter 264).

The junction box 256 also includes three valve driver circuits 278, 280, 282 connected to the terminal 266 for receiving the control signals from the digital-to-analog converters of the local control computers 234a, 234b. The circuits 278, 280, 282 are identified in FIG. 3 as "Parker Boards" because these are circuits of types known to the art for controlling the Parker brand electrohydraulic valves 258, 260, 262 used in the preferred embodiment. The outputs of the circuits 278, 280, 282 are connected to these valves through a terminal 284.

The valves 258, 260, 262 forming other parts of the interface means 238 are located on the blender trailer of the blender system 202 in the hydraulic fluid circuits used to drive the hydraulic motors of the sand screw conveyors 14, 216, 218. Installation of these valves in these hydraulic circuits is made in a manner as known to the art. A manual override can be provided to these valves for backup if the computer-provided signals are interrupted.

In general, the process control system 228 operates by entering control information into the microcomputer 248 either through the remote control computer 230 or a local keypad forming part of the microcomputer 248. Once the necessary control information has been entered, the microcomputer 248 is instructed to operate whereupon it generates control signals in response to the entered information, the real time information received from the monitor computer 232 and the feedback information received from the apparatus performing the process. This operation will be more particularly described with reference to the specific application of the present invention to the blender system 202.

To set up a proppant delivery program to be implemented in the blender system 202, the following information would be entered into the remote control computer 230: mode (e.g., ramp or step type changes in the concentration), pounds of proppant, type of proppant, gallons of fluid, type of fluid, the correction factor for the fluid, minimum and maximum rates for each sand screw conveyor, the expected job rate, correction factors for the sand screws and which sand screws are available to operate. Based on these inputs, the remote control computer 230 computes set points and passes them over the cable 236 to the microcomputers 248 of the local control computers 234a, 234b. The computers 234a, 234b pass back to the remote control computer 230 the proppant rate in pounds per minute, totals, and event codes. The monitor computers 232a, 232b pass back their respectively obtained real time information to the remote control computer 230 over the cable 236. The CRT 240 of the remote control computer 230 displays the relevant job data for ready verification or modification by the operator using the keyboard of the recorder unit 14.

Using the computed set points, the local control computers 234a, 234b will control the respective sand screws of the proppant delivery subsystem 212. During this control, the local control computers maintain information about the current delivery rate of the respective sand screws and the total quantity of proppant delivered. This information can be displayed locally through displays of the local control computers or remotely through the remote control computer 230. Should communication with the remote control computer 230 be lost, the local control computers will continue to automatically control the respective sand screws at the last entered concentration set point so that only the automatic ramping capability will be lost.

In the preferred embodiment, a hydraulic backup is provided in case of a power or control system failure. There is a valve for each sand screw which can be manually operated to allow or not allow the respective electrohydraulic control valve (258, 260, 252) to exert control on the hydraulic system powering the respective sand screw. When the electrohydraulic control valve is disabled in this way, control of the sand screw is effected through the known manual operation of controlling a needle valve at the control stand of the blender.

The control provided by the local control computer is obtained by two independent loops within each computer 234a, 234b implementing a modified proportional integral and derivative (PID) algorithm. The clean flow rate (from the monitor computer 232a) and the respective sand screw speed (the feedback information) are used to calculate the actual sand concentration delivered. The desired sand concentration is set either locally through the keypad or across the local area network (LAN) cable 236 by the remote control computer 230. The difference between the actual and desired sand concentrations is called the error term which the algorithm drives to zero in a precise manner for optimum control. The individual displays on the local control computers can read out the actual sand concentration, the accumulated volume, or the sand screw delivery rate.

Figure 4A:
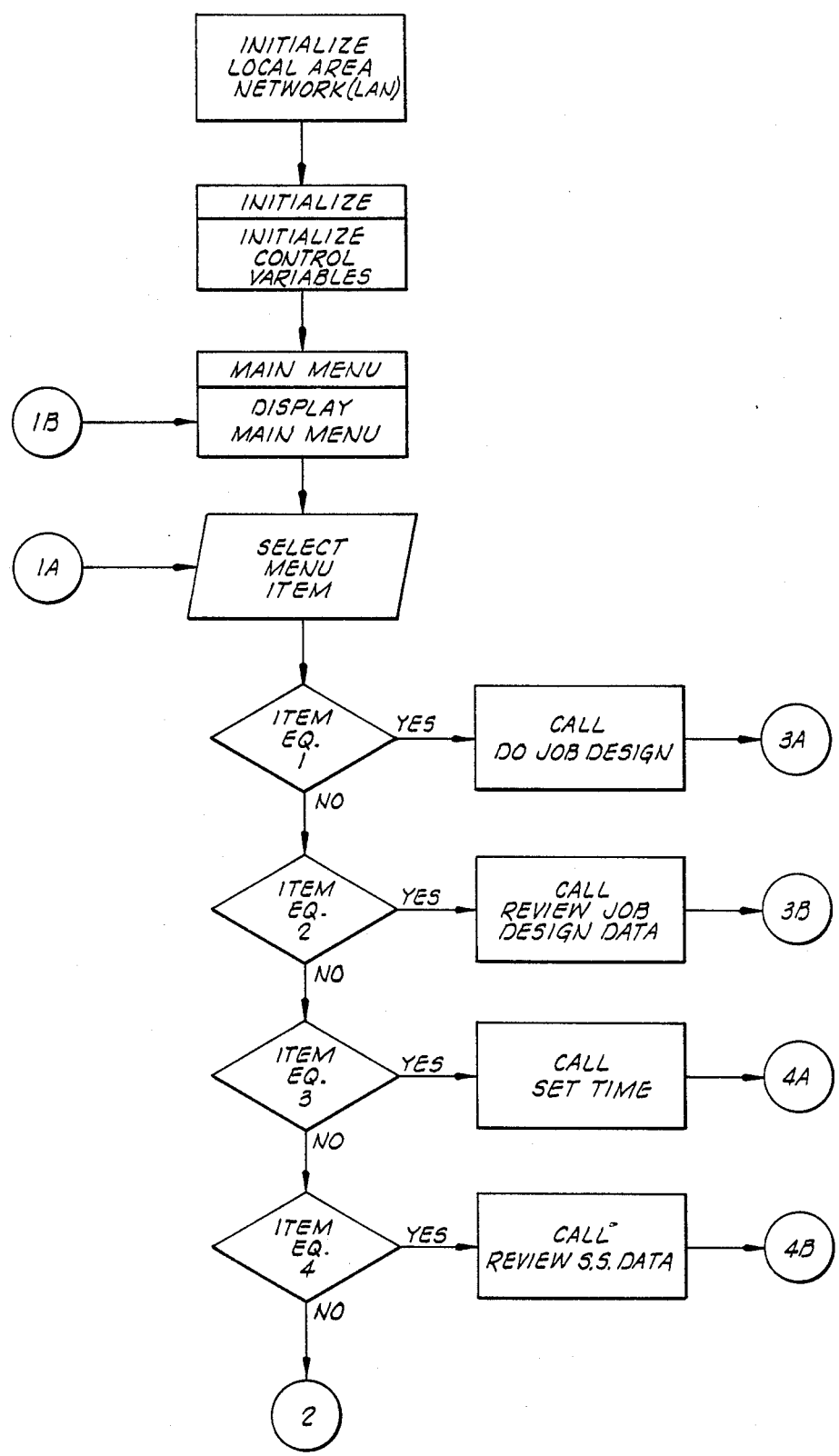
FIGS. 4A-4H are flow charts of programs used in the remote portion of the process control system adapted for the specific application with the blender system.
Figure 4A:
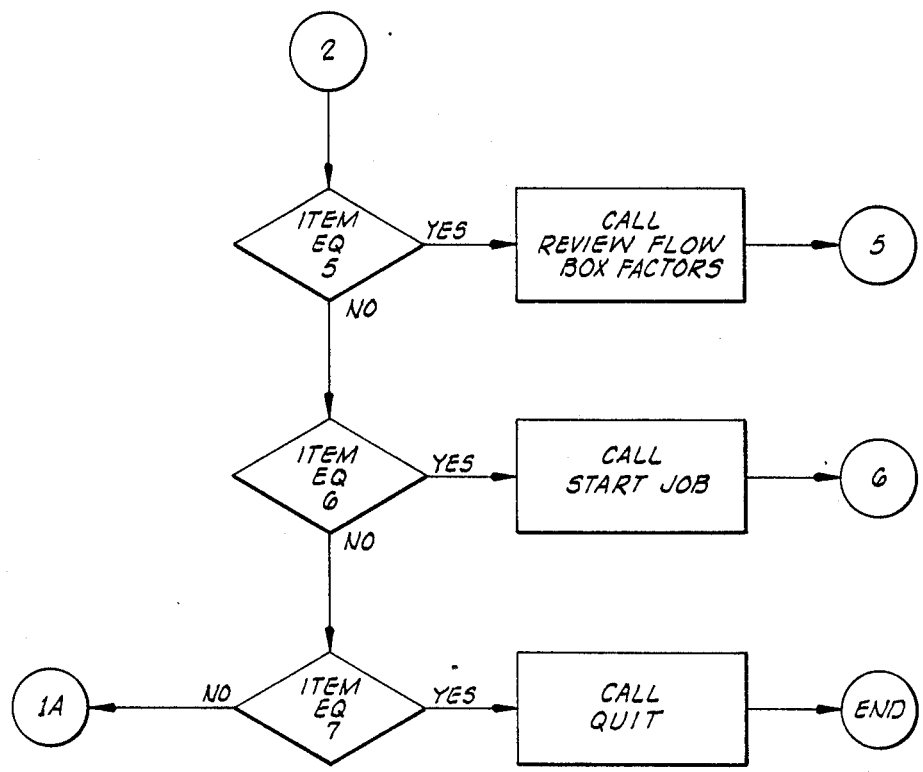

In the preferred embodiment the remote control computer 230 is controlled by the program the flow chart of which is shown in FIGS. 4A-4H. FIG. 4A shows that the remote control computer 230 initializes the network and various control variables before displaying a menu of seven items which can be selected by the operator. Selection of any one of the seven numbers calls the respective one of the identified programs. Each of these programs is shown in the remaining drawings of FIG. 4.

Figure 4B:
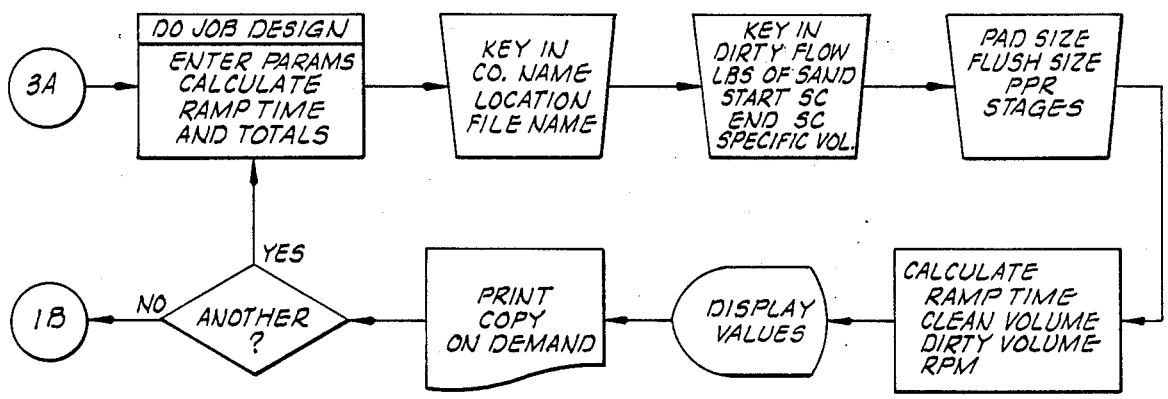

The "DO JOB DESIGN" program is depicted in FIG. 4B. Through this program the job information for a particular job is entered into a file of the computer 230. With this information, the computer 230 calculates data which will be stored for later use in controlling the local control computers 234 when such control is requested through the "START JOB" program shown in FIGS. 4G and 4H.

Figure 4C:
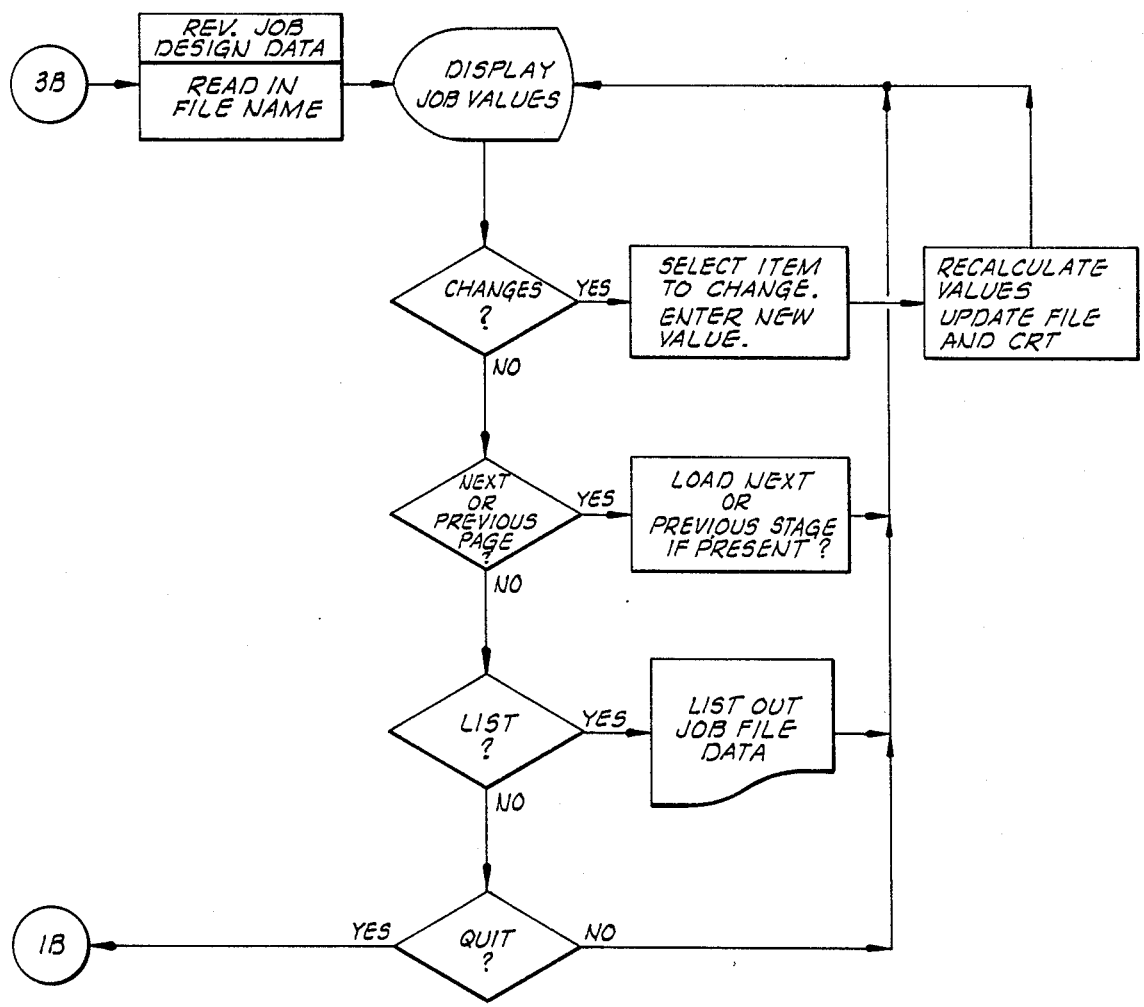

The "REVIEW JOB DESIGN DATA" program shown in FIG. 4C allows the operator to review files already constructed and to make changes as desired.

Figure 4D:
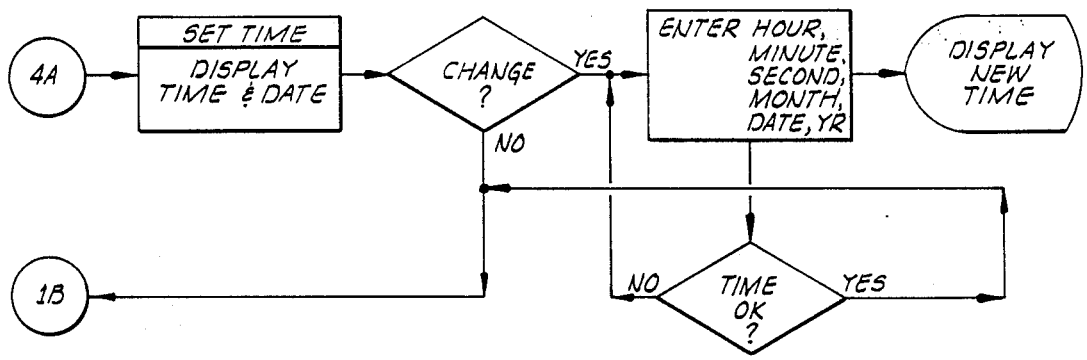

The "SET TIME" program shown in FIG. 4D is called when the time and date information are to be set in the computer 230 or reviewed.

Figure 4E:
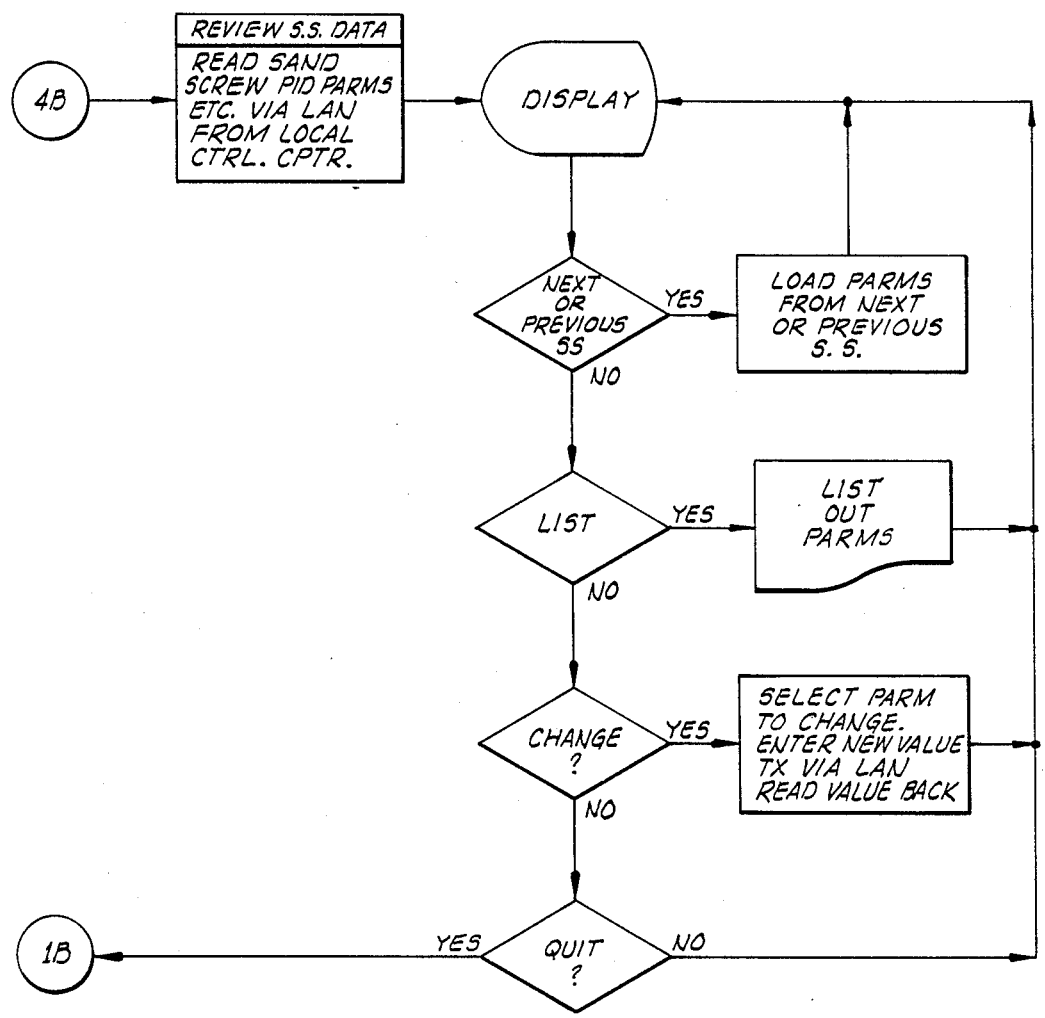

The "REVIEW SAND SCREW (SS) DATA" program shown in FIG. 4E is used to retrieve control information which is stored within the local control computers 234. This allows this information to be reviewed and modified from the remote control computer 230.

Figure 4F:
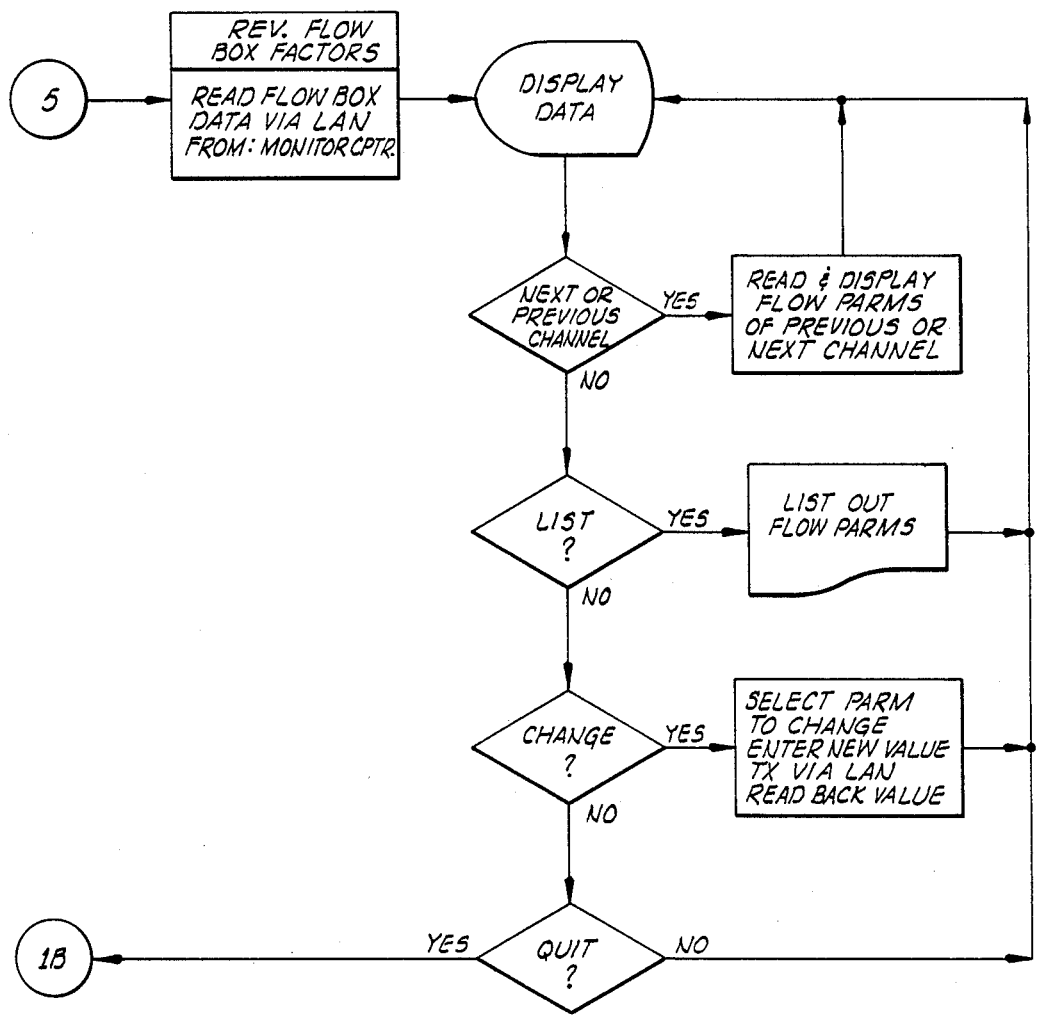

The "REVIEW FLOW BOX FACTORS" program shown in FIG. 4F achieves the same function as the program shown in FIG. 4E except for the monitor computers 232.

Figure 4G:
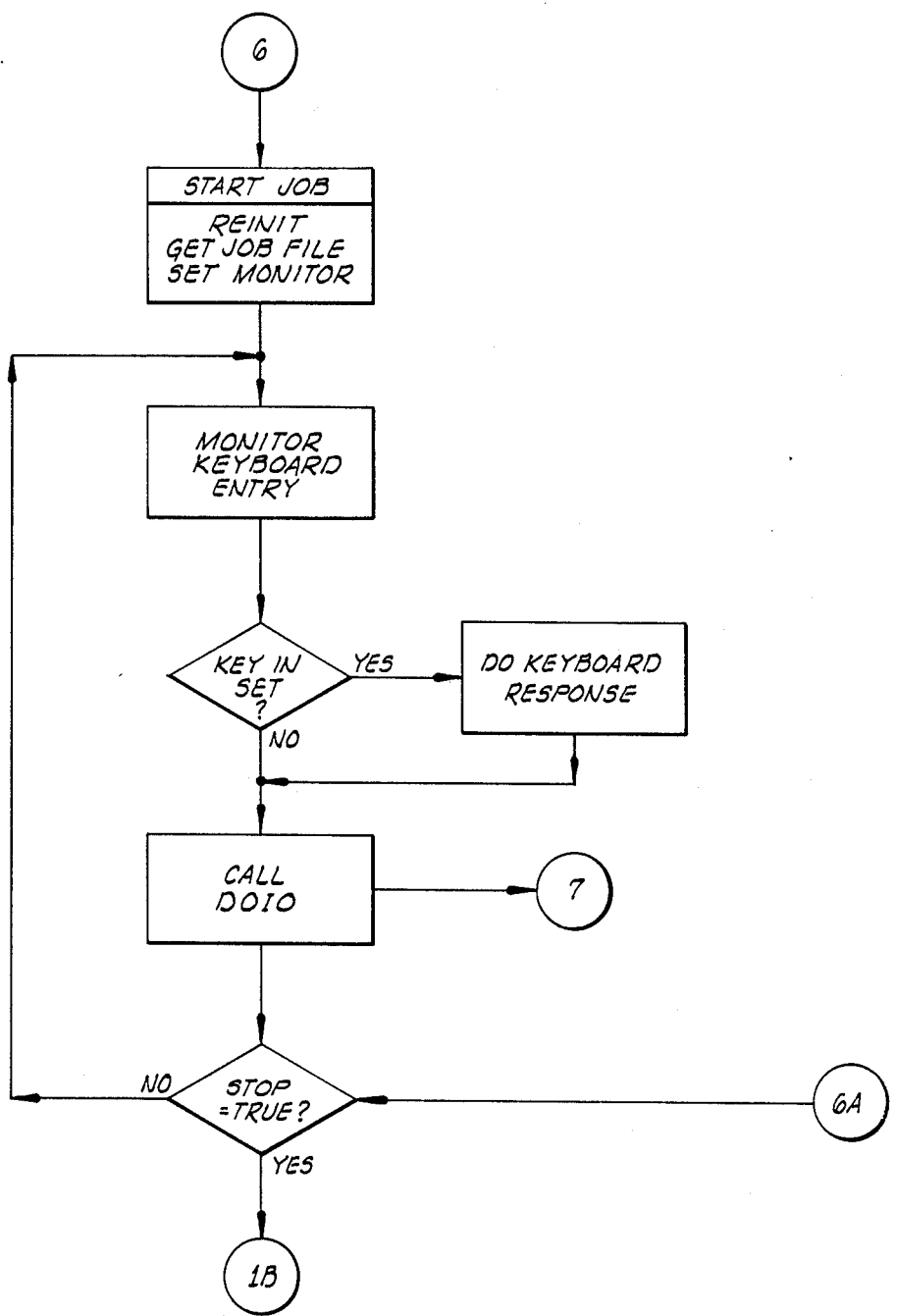
Figure 4H:
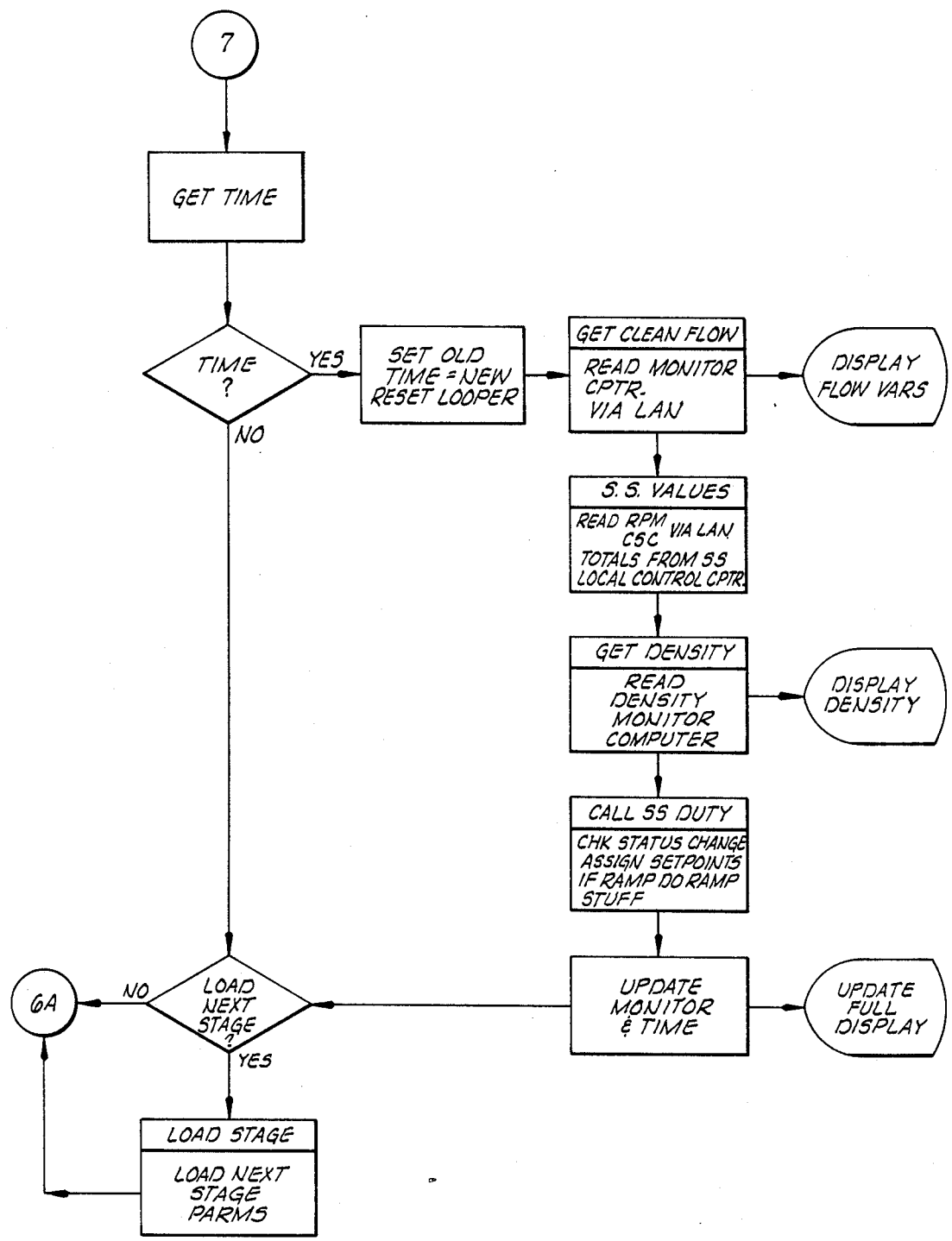

The "START JOB" program shown in FIGS. 4G and 4H is called when a job is to be executed. This program obtains the information from the previously constructed file which has been selected. Information from this file and the real time information received from the computers 232, 234 are used by this program to compute control signals transmitted to the particular local control computer 234 which is connected to the sand screw to be controlled.

The seventh menu item shown in FIG. 4A is the "QUIT" program which allows the operator to return to the CPM3 operating system CCP.COM program.

The flow charts of FIGS. 5A-5F are for programs contained in each of the monitor computers 232 and each of the local control computers 234. These programs are dual-purpose in that they include the programs needed for a blender-mounted computer to operate either as a monitor computer or as a local control computer. Which of these is to be used in a particular blender-mounted computer is selected under control of the remote control computer 230 or locally through the keypad of the respective blender-mounted computer.

The blender-mounted computers functioning as the monitor computers can be used to display the flow rate of the clean fluid flowing into the mixing subsystem 204. The monitor computer can also display the total fluid pumped. The monitor computer monitoring the flow rate can be switched, via the local keypad, between either of the two flow meters 208, 210.

Each local control computer is a stand-alone unit in that it requires only the feedback from the respective sand screw conveyor to generate control signals for the respective sand screw conveyor; however, using the fluid flow rate signal from the monitor computer 232a and the information from the remote control computer 230, a local control computer can run in full automatic mode in which it will ratio the controlled sand delivery based on the clean flow sampled by the selected flow meter. This control is achieved by the modified PID algorithm to control the rotational speed of the sand screw conveyors. The local control computers also use routines to establish exact high and low clean flows by which a slope and intercept are determined for use when reading the clean flow information provided by the monitor computer 232a.

Both the monitor computers and the local control computers use a general purpose array of numbers to allow customizing of functions during a job. These numbers include calibration factors, limits on the PID control parameters, calibration factors relating to sand screw delivery rates, maximum and minimum operating ranges, and sand screw rotational factors.

Figure 5A:
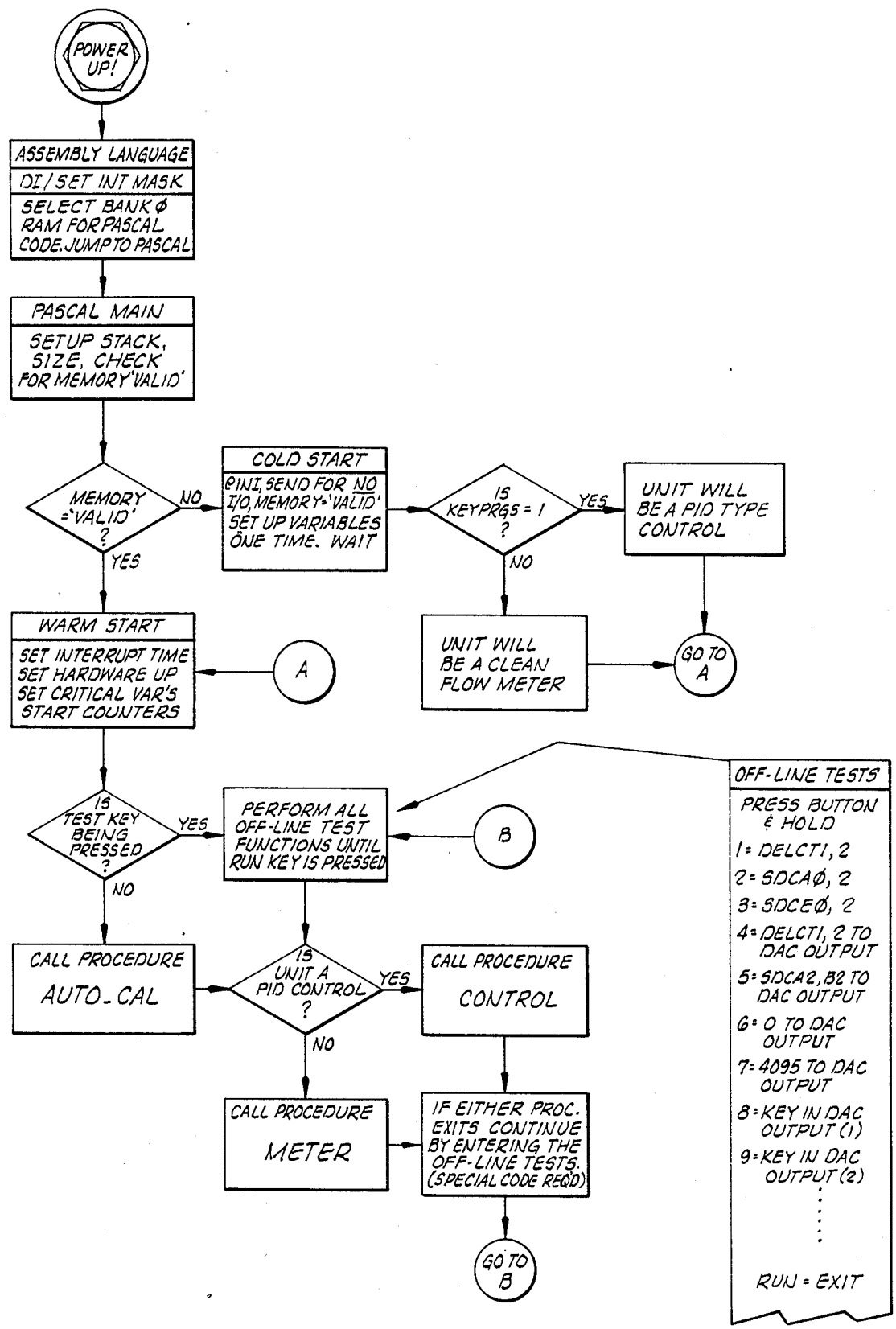
FIGS. 5A-5F are flow charts of programs used in the local portion of the process control system adapted for the specific application with the blender system.

The flow chart of FIG. 5A is a top level description of the program used in both the monitor type and the local control type of the computers 232, 234. This program performs the initialization tasks indicated in the flow chart. The first decision illustrated in FIG. 5A is to test whether the random access memory of the respective local computer has the characters spelling the word "VALID" stored in the proper sequence. If these characters are not found, the program enters a "cold start" phase; whereas if these characters are found, it is assumed that the random access memory has been properly retained and a "warm start" phase is entered.

In the cold start phase, the random access memory is initialized with default values stored in the read only memory. After this the program determines if the numeric "1" key has been pressed. If it has been, this sets the unit as one of the local control computers 234 and the program initializes the computer as such. If the numeric "1" key has not been depressed, this specifies the unit as one of the monitor computers 232, and the program initializes it as such. The program then moves into the warm start phase.

In the warm start phase, the interrupt times for the hardware are set up and variables are initialized. The various counters are started, particularly the interrupt counter. After this, the program determines whether a test key is being pressed and held. If it is, various off-line test functions are performed until the run key is pushed, whereupon the program checks whether the unit is operating as a local control computer or a monitor computer. If the test key is not being pressed, the program performs the "PROCEDURE AUTO.CAL" which autocalibrates the current inputs on the local computer. After this, the program then determines whether the local computer is a local control one or a monitor one.

Figures 5B, 5C:
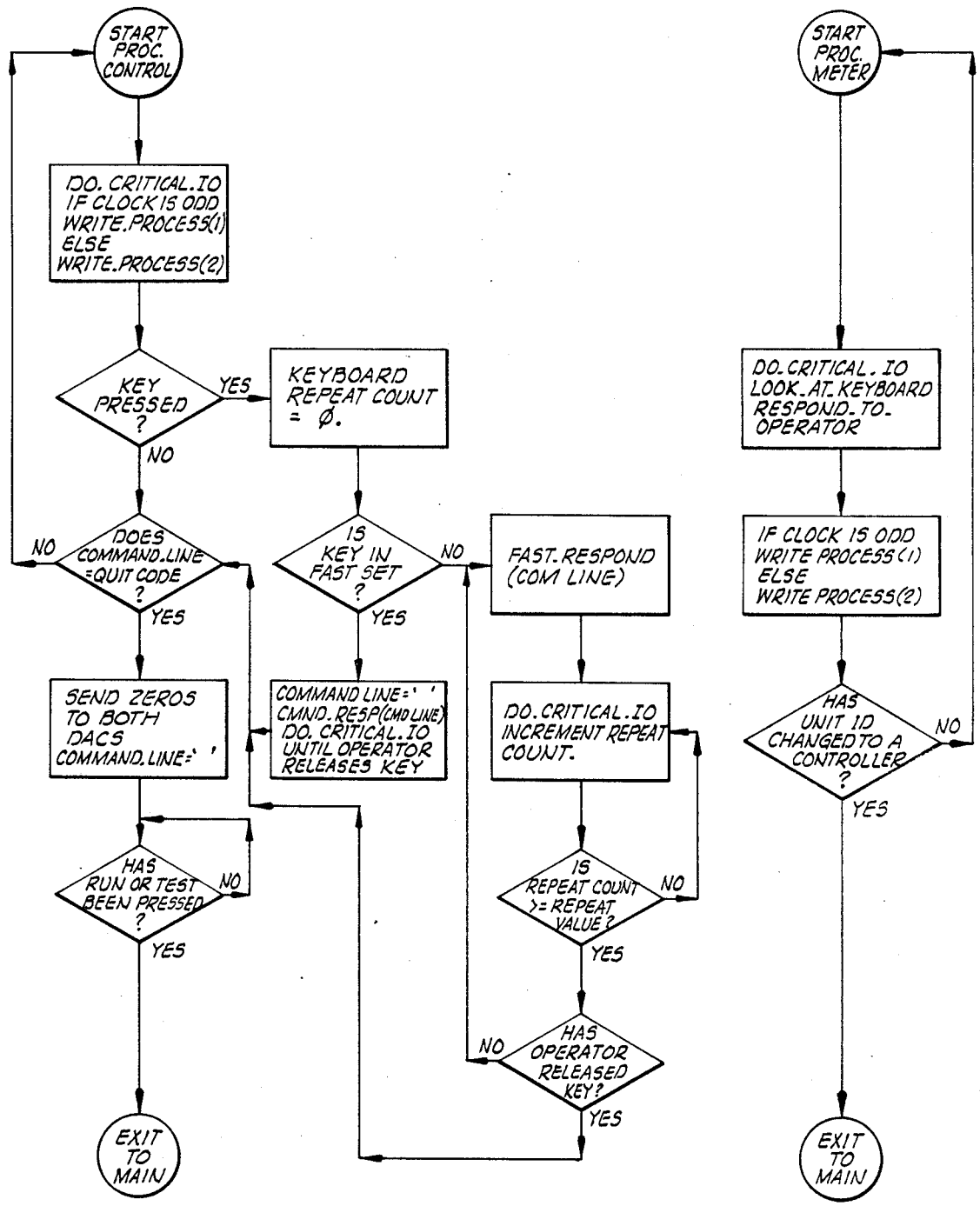

If the unit is a local control computer, the "PROCEDURE CONTROL" program is called; this is shown in FIG. 5B. If the computer is a monitor computer, the program shown in FIG. 5A calls the "PROCEDURE METER" program (shown in FIG. 5C). Upon return from these procedures, off-line tests can be performed and the program loops back to point "B" in FIG. 5A and continues through the loop.

The "PROCEDURE CONTROL" program has a flow chart shown in FIG. 5B. The principal portion of this program is the "DO.CRITICAL.IO" program having a flow chart shown in FIG. 5D subsequently described. After "DO.CRITICAL.IO", the "PROCEDURE CONTROL" program alternately writes the respective process values to be displayed through the two displays of the preferred embodiment local control computer 234. The remainder of the program shown in FIG. 5B pertains to handling various commands entered through the keys of the keypad of the local control computer 234. That is, the program is looking for keystrokes and determining what response to make to those keystrokes.

The "PROCEDURE METER" program has a flow chart shown in FIG. 5C. This program calls "DO.-CRITICAL.IO" and looks at the keyboard to see if it needs to make a response to the operator. This program also does the write process, alternating between the two displays of the preferred embodiment monitor computer 232. This program continually tests to determine if the status of the unit has been changed from that of a monitor computer to that of a local control computer.

Figure 5D:
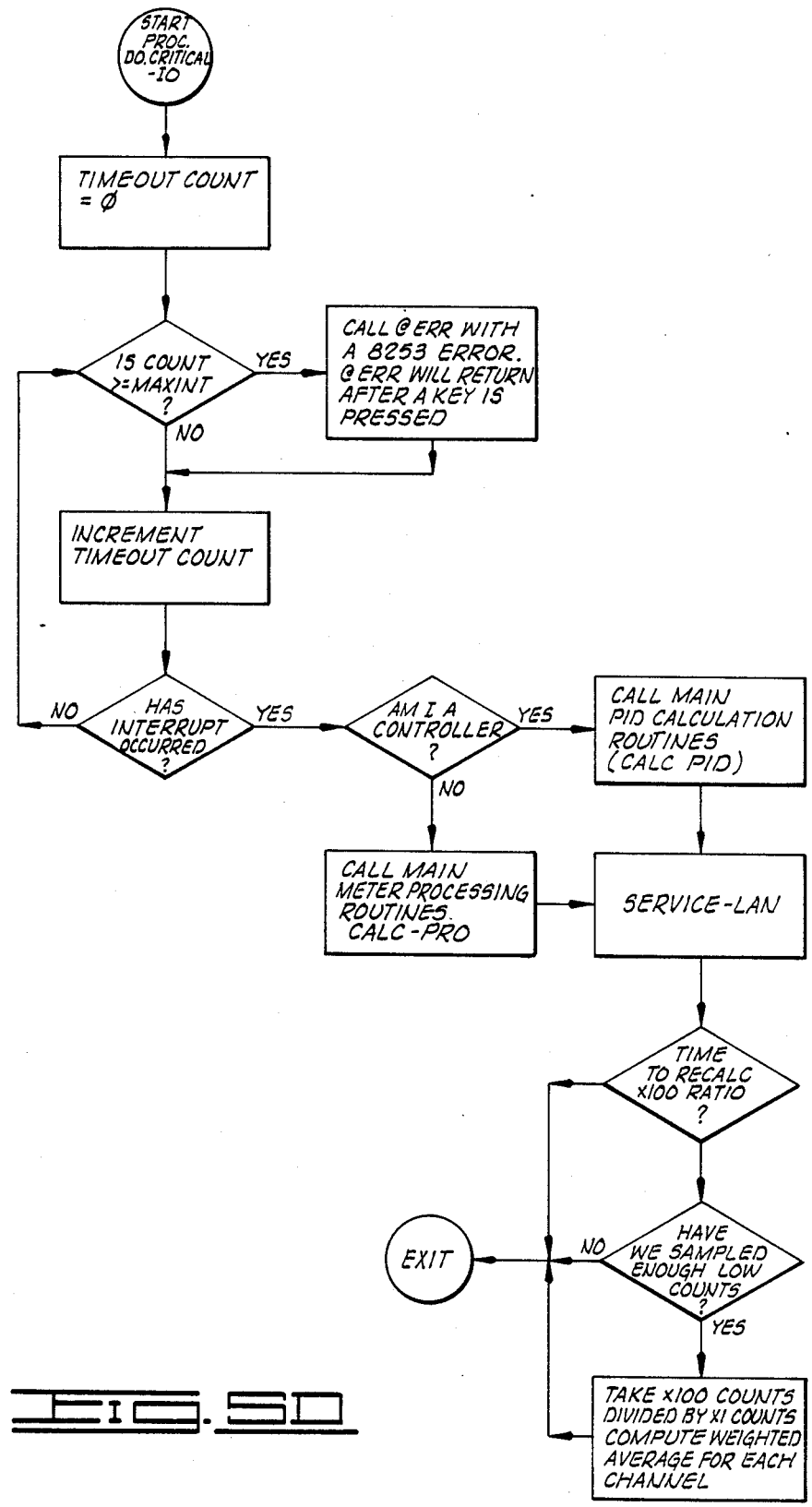

The "DO.CRITICAL.IO" program has a flow chart shown in FIG. 5D. This program initializes the timeout count to zero and then does a test to determine if the count is greater than an integer defining the maximum interrupt time. If the count is greater than this integer, a hardware interrupt error has occurred which is processed as indicated in FIG. 5D. This handling causes an error message to be displayed specifying that there is a hardware problem.

If interrupts occur as they should within the maximum time period, the program shown in FIG. 5D determines whether the particular unit is a local control computer or a monitor computer. If it is a local control computer, the program performs the "CALC.PID" routine shown in FIG. 5E. If it is a monitor computer, the program performs the "CALC.PRO" routine shown in FIG. 5F. After the pertinent one of these routines is performed, the "DO.CRITICAL.IO" program services the local area network (LAN) cable (i.e., constructs the messages, etc., required for communicating over the cable with the remote control computer 230). The "DO.CRITICAL.IO" program then recalibrates in real time as the process is being run.

Figure 5E:
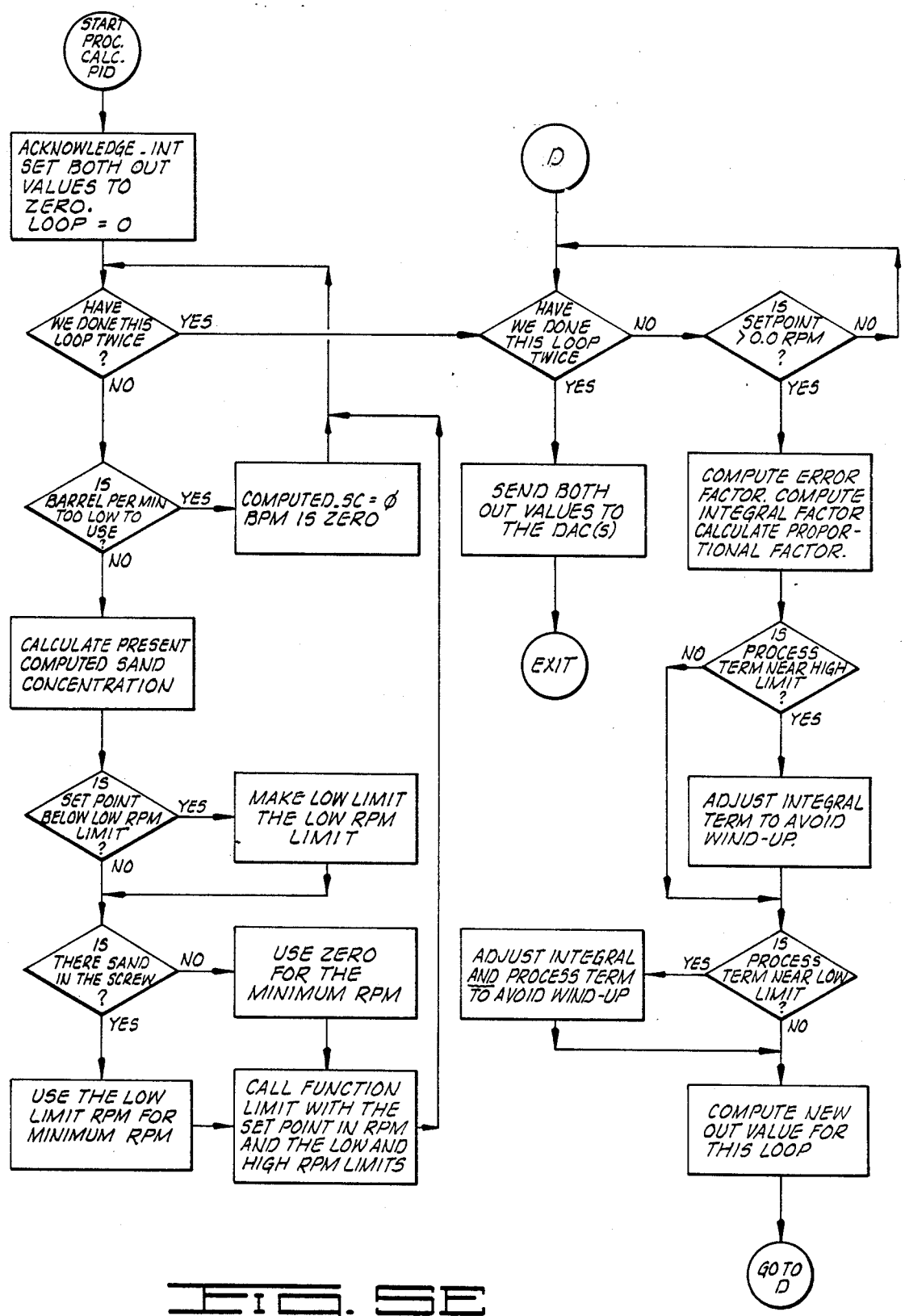

The "CALC.PID" routine has a flow chart shown in FIG. 5E. This routine loops twice, once for each channel (i.e., each sand screw) which can be handled by a single local control computer 234. If the loop has not been completed twice, this routine determines if the barrel per minute flow being detected is too low to use. If it is, it sets the computed sand concentration at zero and the barrel per minute flow at zero. If it is not, the routine calculates the present computed sand concentration. To do this, the routine takes the rpm reading, multiplies it by the pounds per revolution, and divides it by the clean flow rate to compute a sand concentration that is being maintained.

Next, the routine determines whether the set point is below the low rpm limit. If it is, it makes the low limit the low rpm limit. Once this is done, or if the set point is not below the low rpm limit, the routine then determines whether there is sand in the screw. This is a flag that the operator sets (either the operator on the blender or the operator at the remote control computer 230). If there is sand in the screw, the routine uses the low rpm limit for the minimum rpm and calls the function limit. By this, if the rpm limit is outside the upper and lower limits, it will return the upper or lower limit as a maximum or minimum and branch back. Once this branch is done twice, another double loop is performed. If this other loop has not been performed twice, the routine asks if the set point is greater than zero rpm. If it is not, then it branches back and takes no action. Assuming it is greater, it computes an error factor and computes an integral factor and a proportional factor. The routine then makes sure there is no windup, meaning that it insures that the integral is not growing without bound. Once this is done, the new output value is computed for the loop. Once a value is computed for each loop, these values are output through the digital-to-analog converter of the local control computer to the valve drivers of the interface means 238 for that computer.

Figure 5F:
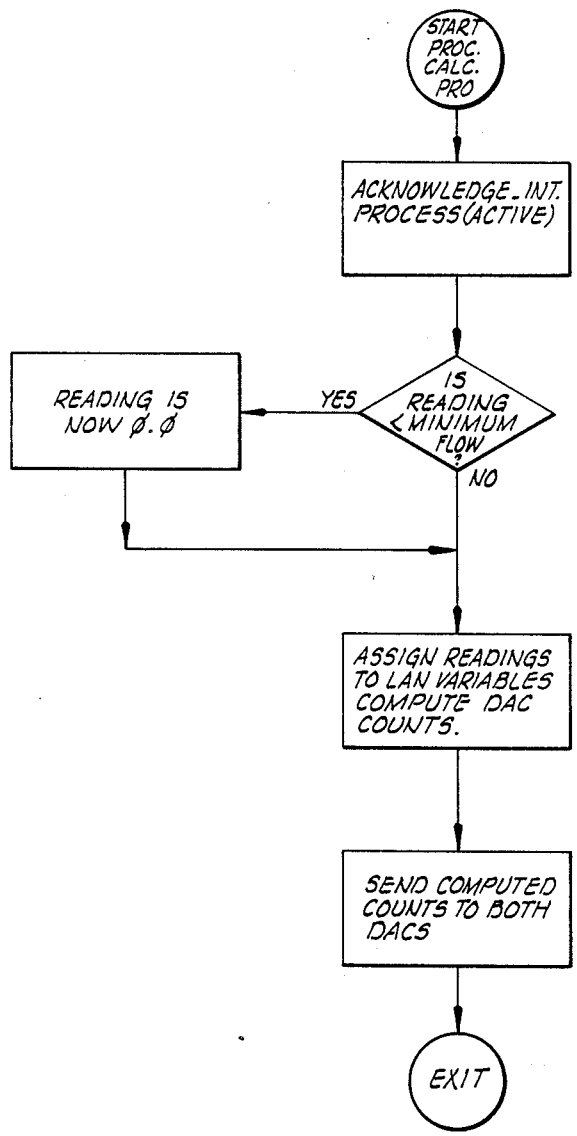

The "CALC.PRO" routine is shown in FIG. 5F. This routine determines if the flow meter reading is below a minimum flow so that any noise readings are discarded. A valid reading is processed and sent to the digital-to-analog converter of the monitor unit.

As described with reference to the specific application to a conventional blender system, the preferred embodiment of the process control system of the present invention is implemented as a kit that can be retrofit to such a conventional blender system. Upon installation and operation, this system will control the proppant delivery from up to three screw conveyors. It can be operated either locally on the blender or remotely, such as from a frac van. The remote operation can control the sand delivery in either a step or ramp mode.

More broadly, the present invention provides a hardware system which can be implemented, without significant hardware modification, to control different types of processes in different types of environments. The only significant modification required is in the software of the distributed computers adapted to perform respective functions.

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

What is claimed is:

1. A process control system for controlling the concentration of a proppant slurry to be pumped down a well bore for stimulating production thereof, said system comprising:
   a remote control computer spaced from a location where the process is performed, said remote control computer including means for entering control information, and for computing at least one set point therefrom;
   a monitor computer disposed at the location where the process is performed, said monitor computer including:
     means for providing real time information about monitored operating characteristics of the process; and
     means for transmitting said real time information;
   a local control computer disposed at the location where the process is performed, said local control computer including:
   means for receiving said real time information from said monitor computer;
     means for receiving feedback information from a controlled characteristic of the process; and
     means for providing, in response to the real time information, to the set point and to the feedback information, a control signal to control the controlled characteristic of the process; and
   cable means for connecting said remote control computer to both said monitor computer and said local control computer, said cable means including two, and only two, communication channels defined between said remote control computer and said monitor computer and said local control computer so that each of said monitor computer and said local control computer communicates with said remote control computer through the same two channels.

2. A system as defined in claim 1, wherein each of said two communication channels includes only a single pair of twisted electrical conductors having one pair of ends connected to said remote control computer and having another pair of ends commonly connected to both said monitor computer and said local control computer.

3. A system as defined in claim 1, wherein:
   said means for providing real time information includes:
     a first microcomputer; and
     a first digital-to-analog converter, connected between said means for transmitting and said first microcomputer; and
   said local control computer includes:
     a second microcomputer, connected to said means for transmitting, said second microcomputer providing a digital output signal based upon said set point, said feedback information and said real time information; and
     a second digital-to-analog converter, connected to said second microcomputer, for outputting said control signal in analog form, based upon said digital output signal.

* * * * *